No. 808,153. PATENTED DEC. 26, 1905.
P. J. W. HELDT.
BALING PRESS.
APPLICATION FILED JULY 22, 1905.

Witnesses
Peter J.W. Heldt Inventor
by
Attorneys

No. 808,153. PATENTED DEC. 26, 1905.
P. J. W. HELDT.
BALING PRESS.
APPLICATION FILED JULY 22, 1905.

Witnesses
Peter J. W. Heldt, Inventor
by C. A. Snow & Co.
Attorneys

No. 808,153. PATENTED DEC. 26, 1905.
P. J. W. HELDT.
BALING PRESS.
APPLICATION FILED JULY 22, 1905.

Witnesses

Peter J. W. Heldt, Inventor
by C. A. Snow & Co.
Attorneys

No. 808,153.  
P. J. W. HELDT.  
BALING PRESS.  
APPLICATION FILED JULY 22, 1905.

PATENTED DEC. 26, 1905.

Witnesses  
Peter J. W. Heldt, Inventor  
by C. A. Snow & Co.  
Attorneys

No. 808,153. PATENTED DEC. 26, 1905.
P. J. W. HELDT.
BALING PRESS.
APPLICATION FILED JULY 22, 1905.

Witnesses
Peter J. W. Heldt, Inventor
by Attorneys

UNITED STATES PATENT OFFICE.

PETER J. W. HELDT, OF EVERLY, IOWA.

BALING-PRESS.

No. 808,153.　　　Specification of Letters Patent.　　　Patented Dec. 26, 1905.

Application filed July 22, 1905. Serial No. 270,850.

*To all whom it may concern:*

Be it known that I, PETER J. W. HELDT, a citizen of the United States, residing at Everly, in the county of Clay and State of Iowa, have invented a new and useful Baling-Press, of which the following is a specification.

This invention relates to baling-presses, and has for one of its objects to provide a mechanism of simple construction, whereby material of any kind—such as cotton, hay, straw, and the like—may be compressed into the form of bales and tied while in the baling-chamber.

A further object of the invention is to provide an improved mechanism for operating the plunger to the end that the compressing movement shall be gradual and exerted with great force during the final stage and to permit a dwell of the plunger for the purpose of permitting tying of the bales.

A further object of the invention is to provide improved mechanism for controlling the operation of the tying mechanism to the end that the bales may be of uniform size.

A still further object of the invention is to provide a mechanism of simple character for introducing the bale-wires across the baling-chamber without rendering it necessary to force the wires or wire-carriers through the compressed material.

A still further object of the invention is to provide novel means for cutting the overhanging material at the completion of the formation of each bale, so that the bales will not be united together when discharged.

A still further object of the invention is to provide a simple form of bale-tying mechanism for twisting the wires at one side of the baling-chamber and severing the same after the completion of each twisting operation.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figs. 2, 3, 4, and 5 are views illustrating in vertical section the plunger-operating mechanism, the views showing the different positions assumed at different stages of a single operation.

Similar numerals of reference are employed to indicate corresponding parts throughout the several figures of the drawings.

The mechanism for effecting compression of the material to be baled is best shown in Figs. 2, 3, 4, and 5, in which the compression-plunger 10 is shown in several different positions, representing, respectively, positions assumed at successive ninety-degree movements of the operating-shaft 11. The plunger is reciprocated within a suitable baling-chamber 11', that is provided with parallel slots 12 in its opposite vertical walls, and the compression-face of the plunger is likewise provided with slots 13, extending transversely across the plunger and in horizontal alinement with the slots 12. Secured rigidly to the shaft 11 is a large gear-wheel and cam-disk 15, one face of which is provided with a cam-groove 16 and the opposite face with a cam-groove 17, the former assisting in moving the plunger and the latter serving as a means for feeding material into the hopper in advance of the plunger. The shaft is provided with a crank and crank-pin 18, that is connected by a link 19 to a pitman 20, the opposite end of the pitman being pivotally connected to a lug or lugs 21, projecting from the rear end of the plunger. Secured to the base or other suitable portion of the framework is a bracket 22, to which is pivoted one end of a lever 23, the opposite end of said lever carrying a pin or antifriction-roller 24, that travels in the cam-groove 16, and this lever is connected to the link 19 by means of a link 25. The point of connection between lever 23 and link 25 is at a point close to the outer end of the lever, while the opposite end of said link is connected at a point about midway of the ends of the link 19.

Figures 2, 3:
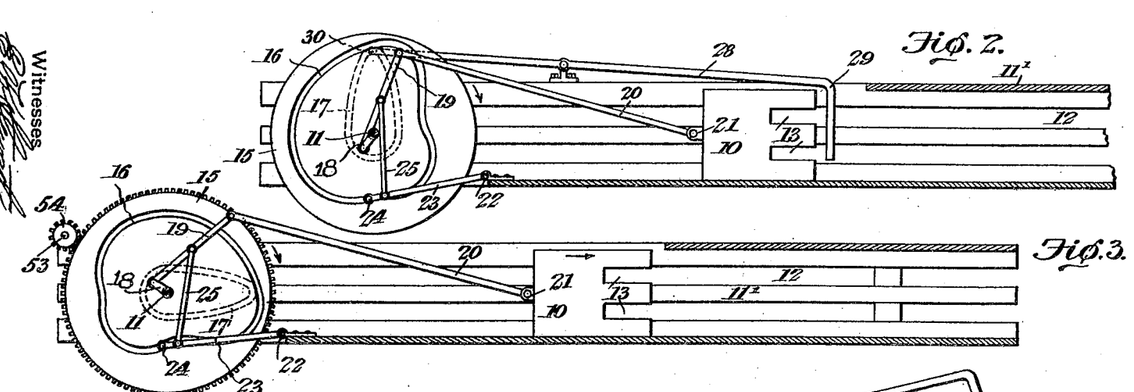
Figures 4, 5:
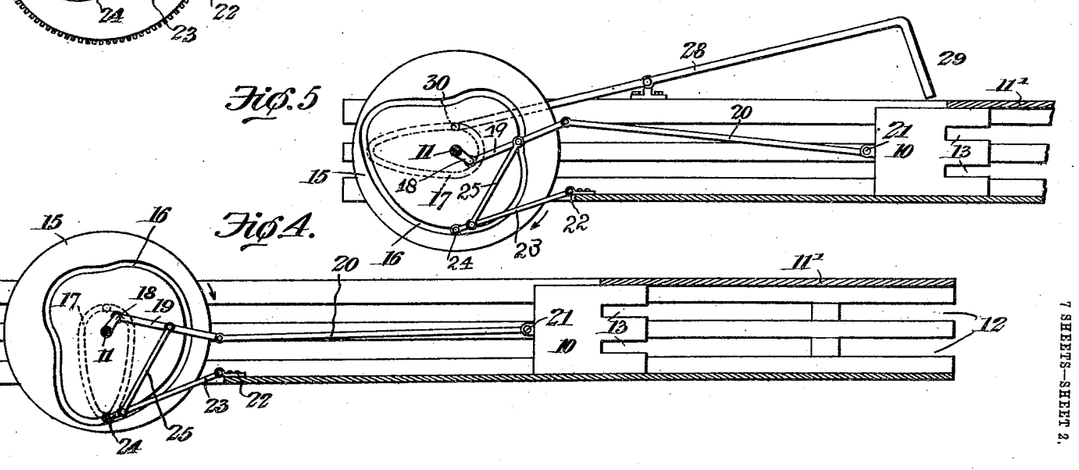
Figure 7:
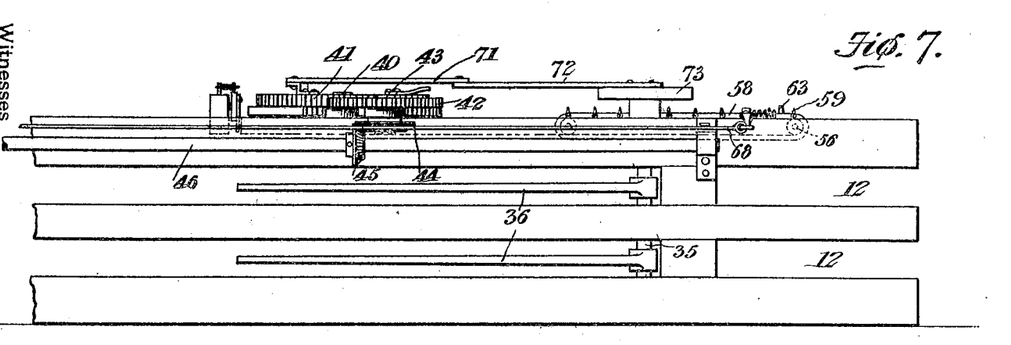
Fig. 7 is a side elevation of that portion of the machine shown in Fig. 6.
Figure 8:
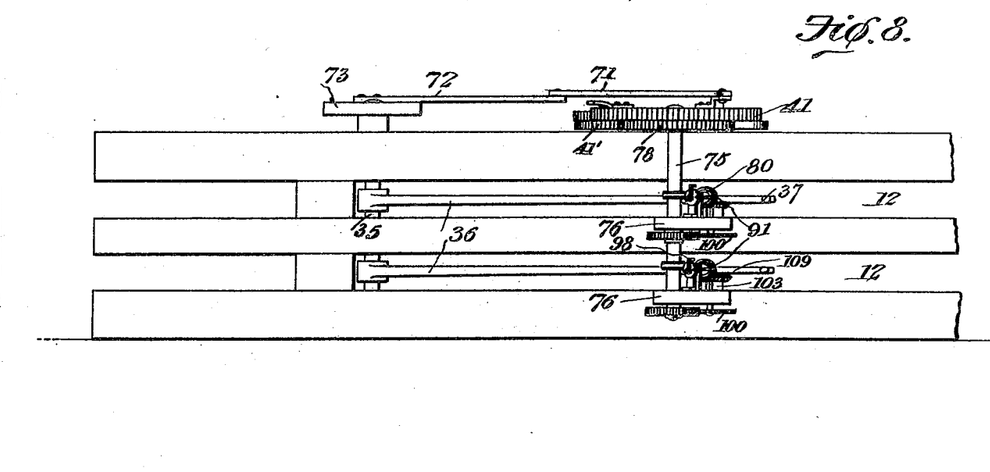
Fig. 8 is a similar view looking from the opposite side of the machine.
Figure 9:
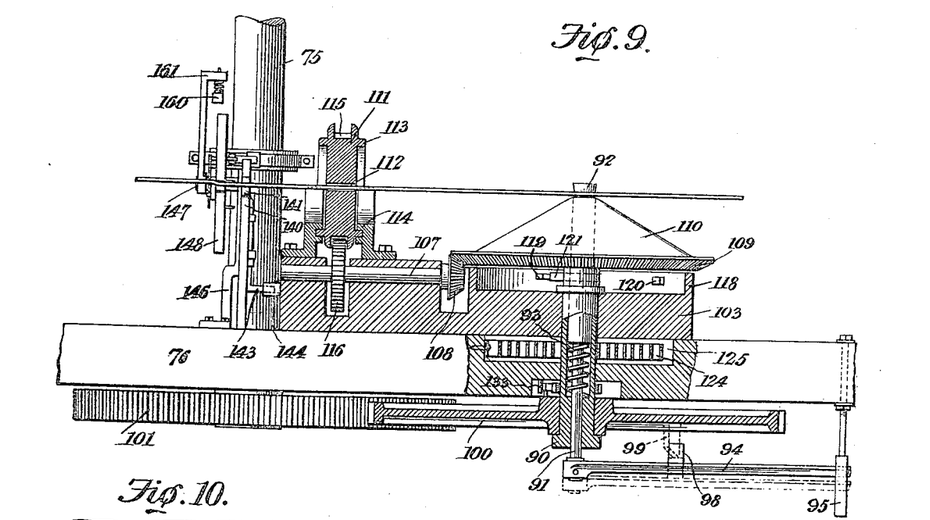
Fig. 9 is a sectional detail view, drawn to an enlarged scale, of one of the twisting mechanisms.

In tracing the operation of the mechanism the parts are shown with the plunger in fully-retracted position in Fig. 2, and the cam disk and gear being rotated in the direction indicated by the arrow the parts will assume the position shown in Fig. 3 when said shaft has moved to the extent of ninety degrees. This movement tends to thrust link 19 upward, and at the same time cam 16 moves the free end of the lever 23 slightly upward; but this at the same time will cause a slightly-forward movement of the link 19, and the plunger will be moved in the direction indicated by the arrow, this being practically the starting of the compressing operation. During the next quarter-movement the compression is completed, and it will be observed on reference to Fig. 4 that at this stage of the operation the outer end of link 23 has been moved positively downward at the same time the link 19 is thrust forward by the crank, and this downward movement exerts powerful leverage on the toggle represented by the connections, and the plunger will be thrust into the baling-chamber with gradually-increasing force during the final steps of the compressing operation. During the next quarter-movement the plunger remains stationary, or practically so, as will be seen on reference to Fig. 5, where the plunger is indicated in the same position as shown in Fig. 4, this movement being permitted by the curvature of the cam 16, which for this portion of the stroke is practically concentric with the axis of the operating-shaft. This dwell is for the purpose of permitting the operation of the bale-wire introducing and twisting mechanisms.

In order to feed the hay or other material into the press in advance of the plunger, a pivotally-mounted lever 28 is employed. One end of the lever is provided with a finger or fingers 29, which may be moved down in advance of the plunger in order to feed the material into the chamber. The opposite end of this lever is provided with a pin or antifriction-roller 30, which engages in the cam 17, said cam being of proper contour to permit operation of the feeding mechanism.

Figures 1, 6:
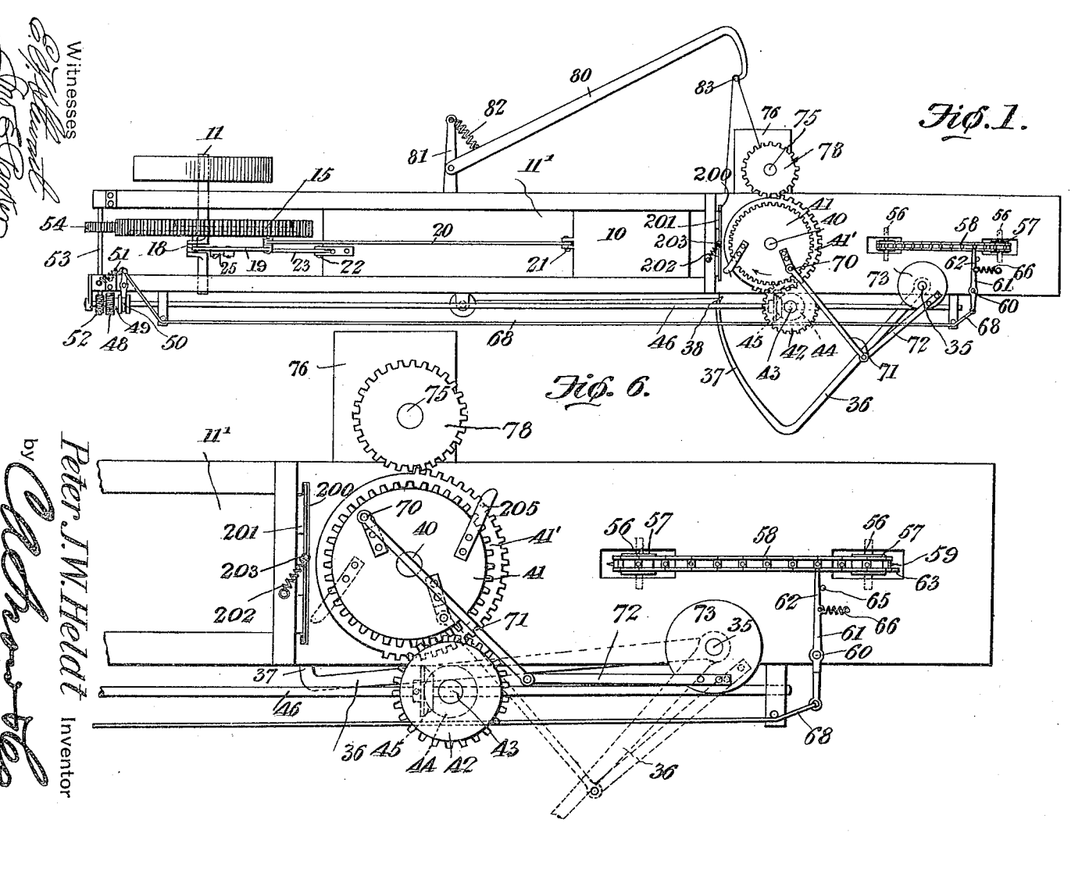
Figure 1 is a plan view of a baling-press constructed in accordance with the invention.
Fig. 6 is a plan view, on an enlarged scale, of the baling-chamber and the mechanism carried thereby.

Arranged at one side of the baling-chamber are bearings for a vertically-disposed shaft 35, to which are rigidly secured two or more arms 36, in accordance with the number of wires to be fastened around the bale, two being shown in the present instance, and to the outer end of each of these arms is secured a curved arm 37, that is arranged on a line concentric with the axis of the shaft 35. The end of each arm 37 is provided with an eye 38 for the passage of a bale-wire, the latter being supported on a reel or fed from any other suitable source of supply, and after the plunger has finished the compression-stroke at the completion of a bale these needles or arms are moved from the position shown in Fig. 1 inward through the slots 12 of the baling-chamber and the similar slots 13 of the plunger and carry or feed a loop of wire across to the opposite side of the baling-chamber, where the loop is engaged by twisting or securing mechanism. For the operation of this portion of the mechanism a vertical stud 40 is placed on top of the baling-chamber, and on this stud is journaled a large gear-wheel 41, that intermeshes with a pinion 42 on a shaft 43, carried by a suitable bracket projecting from the upper portion of the casing or chamber. This shaft is further provided with a bevel-gear 44, which is engaged by a bevel-gear 45 on a shaft 46, the latter extending lengthwise of the baling-press and having suitable end bearings or provided with intermediate supports, if necessary. Feathered to one end of the shaft 46 is a worm-wheel 48, that is secured to a sleeve 49, slidable on the shaft 46. This sleeve 49 is provided with an annular groove for the reception of pins or antifriction-rollers carried by a lever 50, fulcrumed to the frame, the inner end of the lever being engaged by a spring 51, that tends normally to hold the gear out of mesh with a worm 52, arranged on the end of a transverse shaft 53, said shaft 53 being provided with a pinion 54, that is constantly in mesh with the main gear-wheel. The top of the baling-chamber is provided with bearings for the reception of a pair of short shafts 56, having sprocket-wheels 57, over which passes a link-belt 58, the upper run of the belt being above the top of the chamber, while the lower run extends within said chamber to a point in engagement with the material being formed into a bale, and said chain is provided with teeth or spurs 59, which, being positively engaged with the material, will be moved during the process of operation of the machine.

Pivoted on a vertical stud 60 at the top of the chamber is a lever 61, having one arm 62 projecting into the path of one or more lugs 63 on the link belt 58, and said arm is normally held in contact with a pin or stud 65 on top of the chamber by means of a tension-spring 66. The outer arm of the lever is connected by a flexible member 68 to the inner end of the lever 50, so that when one of the lugs 63 engages arm 62 the movement will be transferred through the lever and flexible connection 68 to the lever 50, and the wormwheel 48 will be moved into mesh with the worm 52 in order to transmit movement from the main shaft to the gear-wheel 41 through the connections previously described. The gear-wheel 41 is provided with a crank-pin 70, that is connected by a link 71 to an arm 72, projecting from a disk 73, that is secured to the top of the shaft 35, and gear-wheel 41 makes one complete revolution at each operation and stops at the end of such operation in order that the parts may be adjusted to proper initial position in readiness for a second operation. The crank-pin effects one complete reciprocating movement of the needle or needles, first forcing the needles across the baling-chamber to carry the wires to the opposite side and then withdrawing the same, leaving the baling-chamber free for the introduction of fresh material to be baled.

At that side of the baling-chamber opposite the wire-carrying needles or arms is arranged a vertical shaft 75, carried in suitable bearings formed by brackets 76, projecting from the side of the baling-chamber, and at the top of said shaft is a gear 78, intermeshing with a mutilated gear 41', arranged under the gear 41. This shaft 75 serves as a means for driving the twisting devices which unite the ends of the bale-wire.

Figure 13:
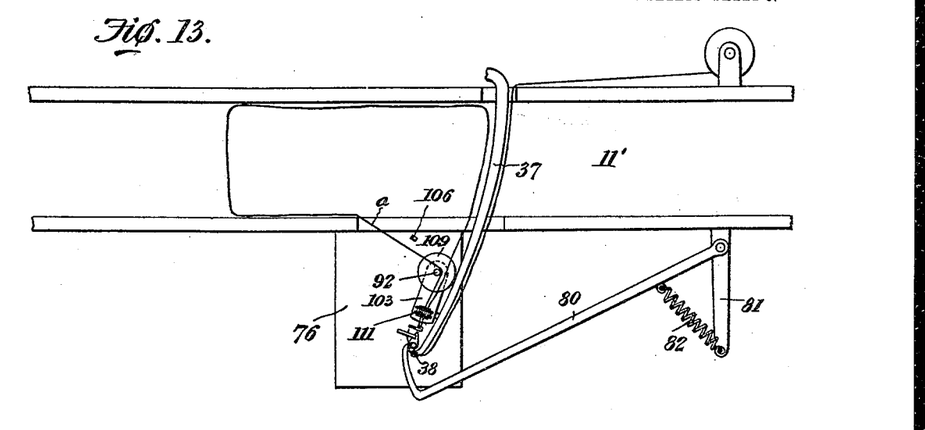
Fig. 13 is a similar view showing the movement of the wire loop across the baling-chamber at the completion of the formation of a bale and illustrating the initial stage of the twisting operation.
Figure 14:
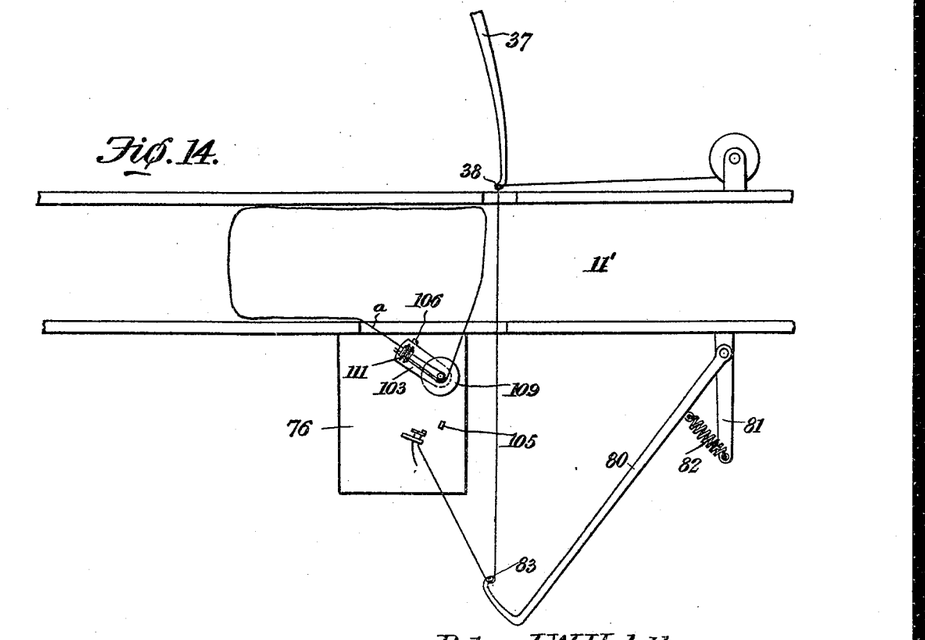
Fig. 14 is a similar view showing the final stage of the twisting operation with the wire leading across the baling-chamber, as in Fig. 11, in readiness for the starting of another baling operation.

Before describing the twisting mechanisms attention is directed to a pair of arms 80, fulcrumed at that side of the chamber at which the twisting mechanism is located, the inner end of each arm being mounted in a suitable bracket 81, projecting from the side of the baling-chamber and being held outward from the chamber by means of a tension-spring 82. The front hooked end of the arm 80 is provided with a wire-engaging finger 83, which is so arranged with respect to the wire hook 37 that when the latter is moved across the baling-chamber the wire will be placed over this finger, the finger at that time being in the position shown in Fig. 13 and being held by portions of the gripping and twisting mechanism, hereinafter described. When released by this mechanism, the arm 80 will move outward and the loop of wire held by the finger 83 will be drawn out to the position shown in Figs. 11 and 14, extending straight across the baling-chamber, and the loop of wire extending beyond the side of the baling-chamber being sufficient to permit the formation of a bale without the necessity of drawing the wire around the bale during the formation of the latter. It will be seen on reference to Fig. 12, which represents the position of the wire at the completion of a bale-forming operation, that practically all of the loop of wire held out by the arm 80 has been drawn in and lies between the bale and the side wall of the baling-chamber, and when the parts assume the position shown in Fig. 12 the bale is practically completed, and at the next stage of the operation the hook 37 will be forced across the baling-chamber in the manner shown in Fig. 13 to introduce a fresh loop, a portion of which is received by the twisting mechanism, while the main loop is received by the finger 83 and again drawn out to effect the necessary slack for the formation of the next bale, as shown in Fig. 14. During the bale-forming operation the arm 80 moves inward against the stress of a spring 82, and the wire is thereafter always held taut.

In each of the brackets 76 is journaled a short vertical shaft 90, said shaft being hollow for its entire length and being arranged to receive a vertically-movable pin 91, the upper end of which is of slightly-increased diameter and forms a slightly-tapered head 92, over which the wire is partly bent during the twisting operation. This folding head or pin is normally held elevated by means of a helical compression-spring 93, arranged within the hollow shaft, and the lower end of the pin, or that end which projects below the shaft, is secured to an arm 94, the outer end of which is guided in a suitable bracket 95, depending from the bracket or platform 76. This arm is provided with a vertical lug 98, that is engaged by a cam 99, carried by a gear-wheel 100, mounted loosely on the shaft 90 and in constant mesh with a gear 101 on the vertical shaft 75. The connection between the hollow shaft 90 and the gear 100 is in the form of a pawl-and-ratchet mechanism 102, which will permit the gear to impart rotative movement to the shaft in the direction indicated by the arrow in Fig. 10 and will allow said shaft 90 to move in the opposite direction without moving the gear 100. It may be noted at this time that the gear 100 makes one complete revolution in one direction and then stops, this movement being imparted to the gear through the shaft 75, gear 101, and the gearing connections at the top of the baling-chamber, and this one revolution is sufficient to accomplish the twisting of the wire and the cutting and the gripping of the same at the proper time, as will hereinafter appear.

Figure 10:
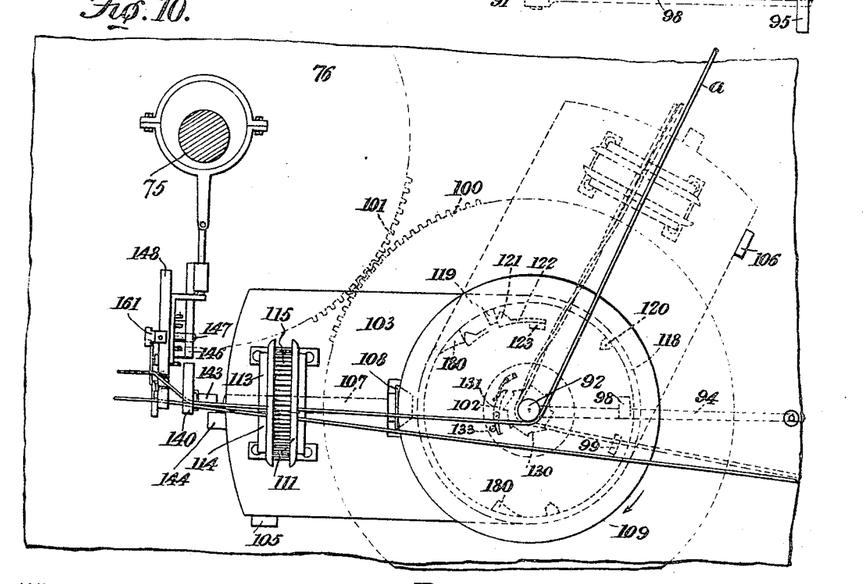
Fig. 10 is a plan view of one of the twisting mechanisms.

The hollow shaft 90 forms a spindle on which is loosely mounted a block 103, which moves from the full-line position shown in Fig. 10 to the dotted-line position shown in the same figure in order to accomplish the twisting operation, and thereafter is moved back to the initial full-line position in readiness for a subsequent operation. The movement in one direction is checked by a stop 105 and in the opposite direction by a stop 106.

The block 103 is provided with bearings for a short shaft 107, that extends on a radial line from the axis of the shaft 90 and is provided at its inner end with a bevel-pinion 108, that intermeshes with a bevel-gear 109, rigidly secured to the upper end of the hollow shaft, and on top of this bevel-gear is a cone 110, which serves as a guard or guide for directing the wire to be bent or turned up against the bending-pin 92.

The block 103 forms a support for a wire-twister, the active member of which is in the form of a disk 111, that is provided with a radial slot 112, extending from the center to circumference and arranged for the reception of the wires to be twisted. This disk is provided with a pair of annular flanges 113, one of which extends from each side of the disk, and these flanges are arranged in curved grooves formed in brackets 114, carried by the block 103. The periphery of the disk is curved, and the lower inner wall of the groove is provided with an annular rack 115, which intermeshes with the teeth of the pinion 116, carried by the shaft 107. This twister receives two movements for each operation, the first movement being to the extent of about one and one-half revolutions and the final movement to the extent of about three and one-half complete revolutions, the first of these movements occurring while the block 103 is in the full-line position shown in Fig. 10 and the second while the block is in the dotted-line position illustrated in the same figure.

That portion of the block 103 below the bevel-gear 109 is provided with a circular recess forming a vertically-disposed annular flange 118, and projecting from the inner wall of said flange are two lugs 119 and 120, the lug 119 being approximately square, while the lug 120 has two tapered faces, which are arranged to be engaged by a tapered block 121, carried by a spring 122, that is secured to a lug 123, depending from the bevel-gear. Initially the block 121 rests against the square lug 119, as shown in Fig. 10, during the first movement of the pinion—that is to say, during the one and one-half revolutions of the same, and at the completion of this movement the bevel-gear 109 will have turned to such an extent that the block 121 will then engage with the tapered lug 120. Thus lug 120 being carried by the block 103 will effect the transmission of movement from the gear to the block and the latter will be turned until it comes solidly against the fixed stop 106, this being the final position of the block 103. As the resistance offered by the stop 106 is much greater than the resistance offered by the spring-held block 121 and as the gear-wheel continues to rotate the block 121 will slide over the lug 120 and the twister will again start its rotative movement, this movement continuing until the twister has turned about three and one-half times, at which point the twisting of the wires is completed, and the parts are then ready to return to initial position. To accomplish this return movement, the spring 124 is employed, the spring being disposed in a recess 125 in the upper portion of the bracket 76 and having its outer end rigidly secured to the wall of the recess, while its inner end is secured to the periphery of the hollow shaft 90. This spring is placed under stress during the movement of the block 103 from the full-line to the dotted-line position, and after the completion of the twisting operation the spring in unwinding will restore the gear-wheel and the block to initial position.

Figure 19:
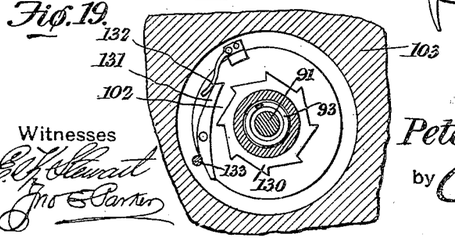
Fig. 19 is a detail view of the pawl and the ratchet connection for moving the twister.
Figure 20:
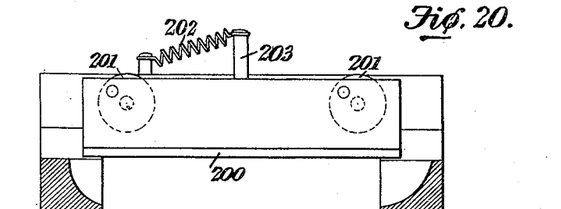
Fig. 20 is a detail view of the cutting-knife for severing excess material at the completion of each bale.

The return movement of the twister and block 103 is permitted by the pawl-and-ratchet mechanism 102, hereinbefore referred to. This mechanism comprises a ratchet-wheel 130, that is rigidly secured to the hollow shaft, and a pawl 131, pivotally connected to the hub of the gear 100 and normally held by a spring 132 in engagement with the teeth of the ratchet-wheel. As the gear 100 makes one complete revolution and the gear 109 makes less—for example, seven-eighths of a revolution—it is necessary to provide for the lost motion between the two, as well as to permit the removal of the pawl from the ratchet in order to allow the return movement of the gear 109. This is accomplished by a pin 133 on the stationary bracket 76 and disposed in such position that after the main gear 100 makes one complete revolution the tail of the pawl will engage the pin 133 and will be moved out of contact with the tooth of the ratchet with which it then engages, the pawl moving to the full-line position shown in Fig. 19 and remaining out of contact with the ratchet-wheel during the beginning of the next movement of the gear-wheel, so that as the tail of the pawl is still in engagement with the pin when the gear-wheel starts to move and does not disengage from the pin until said gear has made about one-sixteenth of a revolution the pawl will not drop into engagement with the ratchet-wheel and will not become active until the gear-wheel has made one-eighth of a revolution and thereafter will carry the ratchet-wheel, together with the bevel-gear 109, through the remaining seven-eighths of a revolution, and at the end of that time, being the end of one complete revolution of the gear-wheel, the pawl will be again disengaged in order to allow the gear-wheel 109 to reassume its initial position.

Figure 17:
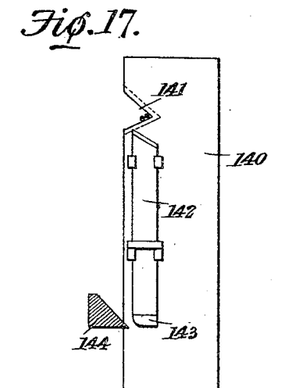
Fig. 17 is a detail elevation of the wire-cutter.
Figure 18:
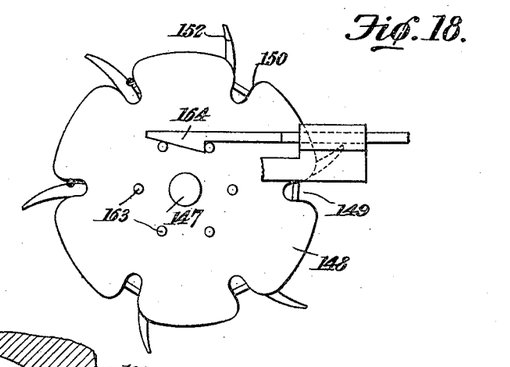
Fig. 18 is a detail view of the mechanism for operating the wire-gripping wheel.

The bracket 76 forms a support for a wire-cutter which is of the construction best shown in Fig. 17. This cutter includes a standard 140, provided with a V-shaped notch 141, the walls of the notch being sharpened to form a cutting edge, and with this coöperates a slidable knife-bar 142, mounted in suitable guides on the standard 140 and provided at its lower end with a projecting lug 143, that is arranged to be engaged by a cam 144, projecting from the end of the block 103. As this block starts the movement from the full-line position the cam 144 rides under the lug 143 and raises the knife 142 in order to sever the wires which have previously been placed in position in the notch 141.

To the rear of the cutters is arranged a standard 146, at the upper portion of which is a bearing for the reception of a short shaft 147, on which is mounted a gripper-disk 148 provided with a series of peripherally-disposed wire-receiving notches 149, equidistantly spaced and of the same construction, one wall of each notch being roughened to form a wire-gripping jaw 150. The opposite wire-gripping jaw is formed by a pivotally-mounted arm 152, the inner end of which is mounted on a pin 153, carried by the disk, while the outer end of said arm projects some distance beyond the periphery of the disk and is curved to form a guide to assist in entering the wire in the notch. The arm 152 is normally pressed in the direction of the gripping-jaw 150 by a small leaf-spring 154, but its movement is at times restrained by a spring-pressed latch 155, pivoted at one end of the disk and having at its opposite end a shoulder arranged to engage a lug 157, projecting from the arm. The latch 155 extends across the notch and is in the path of movement of the entering wire, so that if the arm be in the open position on the entrance of a wire the contact of a wire with the latch will force the latter inward, moving it from engagement with the lug 157 and allowing the spring 154 to force the arm forward into engagement with the wire, the wire being then gripped against the jaw 150. The wire enters the notch while the latter is in the horizontal plane of the shaft 147 and remains gripped until during the revolving of the disk the arm 152 engages against a spring-pressed block 160, carried by an arm 161, that is supported by the standard 146. As the arm passes under this block it is retarded, while the disk continues its movement, and the arm is thereafter moved to open position, and being open the latch 155 immediately springs into place against the lug 157, thus locking the arm in open position in readiness for the reception of another wire.

In order to operate the disk 148, the free face of said disk is provided with a series of pins 163 of a number equal to the number of notches 149, and with these engages a pawl 164, operated at suitable intervals from the vertical shaft 75.

Figure 11:
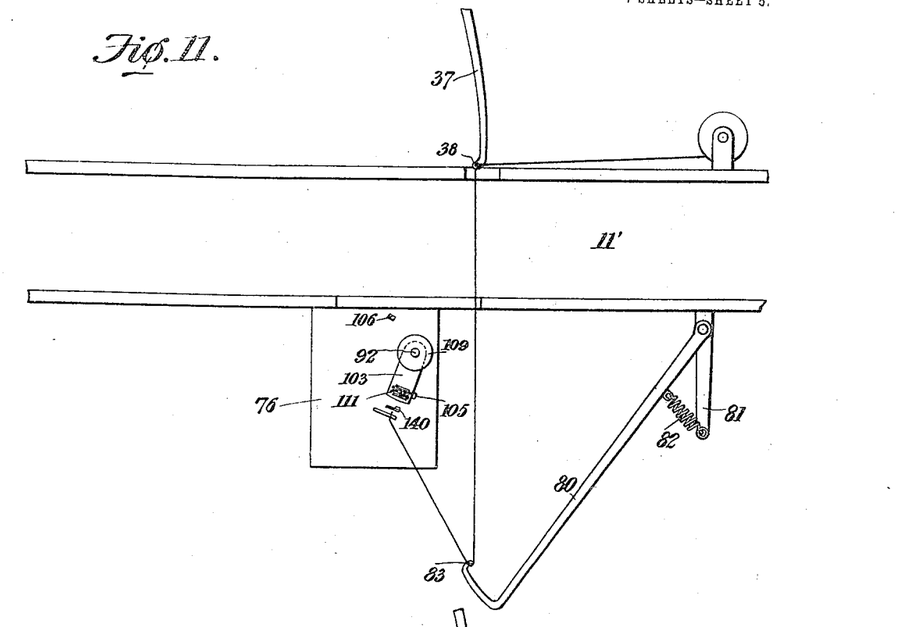
Fig. 11 is a plan view in the nature of a diagram, illustrating the position of the bale-wire and the mechanism for manipulating the same, the parts being shown in the positions which they occupy after the wire has been thrust across the baling-chamber prior to the formation of a bale.
Figure 12:
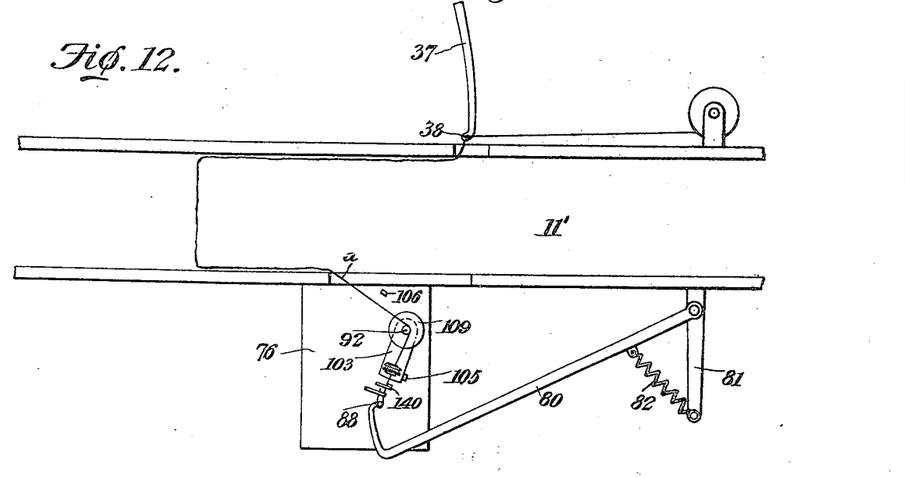
Fig. 12 is a similar view showing the position assumed by the wire at the completion of a bale.
Figure 15:
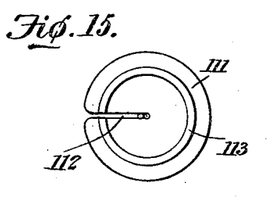
Fig. 15 is a detail elevation of one of the twisters.
Figure 16:
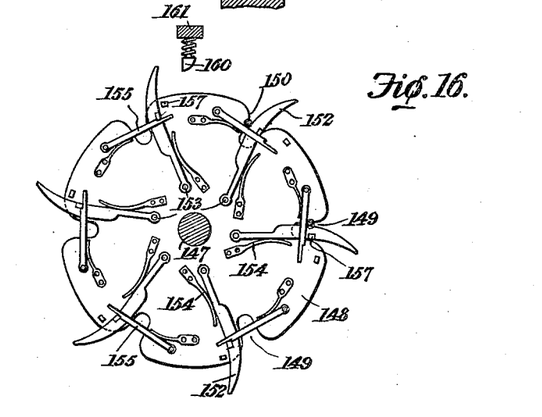
Fig. 16 is a detail elevation, drawn to an enlarged scale, of one of the wire-gripping devices for holding the wire between intervals of twisting.

In following the operation of the mechanism it will be assumed that the parts are in the position shown in Fig. 11, with a wire extending from the reel across the baling-chamber to the finger 83 and thence to one of the gripping-jaws, the latter being a jaw that is disposed above the horizontal plane of the shaft 147. In this position the loop of wire upon the finger 83 is held under stress by the spring 82. As the bale is formed wire is given out on one side by the reel, and on the opposite side the spring 82 yields and the finger 83 is gradually drawn toward the gripping-disk 148, the parts assuming the position shown in Fig. 12 at the completion of a bale. The mechanism is then set into operation by throwing the worm-wheel 48 into mesh with the worm 52, as previously described, and the movement is transmitted through the gears 45, 44, 42, 41, and the shaft 40, thus moving the needle 37 across the baling-chamber in the manner shown in Fig. 13. The needle 37 is curved and its eye is so placed with relation to the groove of the twister, the cutting-notch, and the gripper that the inner portion of the loop of wire will pass into the twister-groove, the cutting-notch, and that recess of the gripper which is in the horizontal plane of shaft 147. In entering the gripper-recess the wire will engage the latch 155 and the gripping-arm 152 will be released, forcing the wire against the curved jaw 150 and firmly clamping the loop of the wire. The loop carried by the eye 38 passes beyond the finger 83, which is still held by the previously-formed loop extending between the gripper and the bale, so that said finger now has two loops of wire, and the wires of both loops are gripped by the arms 152, one being within one recess and the other in a second recess of the gripper-disk. The mutilated gear 41', below the gear 91, then comes into engagement with the gear 78, and movement is transmitted to the shaft 75. This turns gear-wheel 101, and the latter being in mesh with the gear 100 operates the latter. The pawl 131 moves from the pin 133 and engages the ratchet-wheel 130 of the hollow shaft 90, starting the operation of the twister, which at this time has two wires within its twisting-groove, one the initial wire shown in Fig. 12 and the other the inner side of the loop fed over by the needle 37. It may here be remarked that during the progress of formation of the bale the wire shown in Fig. 11, moving to the position shown in Fig. 12, is engaged by the pin 92 and is directed into the groove of the twister, so that when the second wire is received the twister is ready to operate. The two wires are twisted to any desired extent. In the present instance the twister rotates one and one-half times, and at the end of that time the block 121 engages the inclined lug 120 and starts to turn the block 103 from the full-line position shown in Fig. 10 toward the dotted-line position shown in the same figure. The first result of this movement is to bring the cam 144 under the finger 143 of the cutting-knife, (shown in Fig. 17,) forcing the knife upward and severing two portions *a* and *b* of the wire, which have been partly twisted, so that said portions are then free to move with the twister to the dotted-line position of Fig. 10. As an immediate result of the severing operation the spring 83 throws the loop of wire outward to the position shown in Fig. 14, enough wire being taken up to permit the formation of the next bale, while the small loop of wire retained in the twister is straightened out by the outward movement of the finger 83, and when the gripping-arm 152, which holds this small loop, passes under the block 160 it will be released and will fall from the machine. During this movement the needle 37 is retreating and finally assumes the position shown in Fig. 14 at the completion of the operation. By turning the twister-disk one and one-half times the radial groove 112 is turned to a position diametrically opposite that shown in Fig. 15, and said disk then ceases to rotate until the parts assume the dotted-line position, another portion of the wire *a* being then received within the groove of the twister and the twisting operation again starting during the continued movement of the gear-wheel 109. At the completion of this twisting operation the twister-groove is in the same position which it occupied at the starting of the second twisting operation, so that as the block 103 starts on its return movement the twister is free to leave the twisted wires. At the completion of the twisting operation the pawl 131 engages the stop 133 and is moved from engagement with the ratchet-wheel 130, and at the same time the cam 99 engages lug 98, pushing down the arm 94 and the spindle 81, thus withdrawing the pin 92 from engagement with the loop of wire. The spring 124, placed under stress during the twisting operation, then rapidly restores the parts to initial position. The gear-wheel 109 rotates and in rotating moves the twister, so that the latter is restored to its initial position. Immediately preceding the turning of the twister, however, the block 121 has engaged a second lug 180, and the block 103, to which said lug is secured, is immediately turned back to its initial position, the turning of the twister following this movement and the parts being stopped in proper position when the end of the block 121 engages against the square lug 119, so that the groove of the twister is restored to the horizontal plane in readiness to receive another wire. It will be seen that by this mechanism an exceedingly strong connection may be made between the ends of the wire. A further advantage gained is that the intertwisted ends of the wire become intertwisted with a portion of the bale-wire and are thence firmly bound down, so that they cannot project and catch in adjacent bales, and thus prevent or render difficult the proper storing of bales.

The connection also is much stronger than when the two ends of the wire are simply intertwisted, and danger of untwisting under stress is avoided.

In order to sever the material protruding from the baling-chamber after the completion of a bale, a cutting-blade 200 is arranged at the top of the baling-chamber immediately over the entrance thereof, and this blade is mounted on a pair of pivots carried by disks 201. Normally the blade is held in elevated position by a spring 202, that extends between a fixed point on the frame and a pin 203 on the blade. The gear-wheel 41 is provided with a projecting finger 205, which engages with the pin 203 as the gear-wheel rotates, and this depresses the blade, which, acting against the top of the plunger, severs excess material from the blade. When the finger 205 passes beyond the pin, the blade will be retracted by the spring 202 and elevated to its initial position.

Having thus described the invention, what is claimed is—

1. In a baling-press, a baling-chamber, a compression-plunger, an operating-shaft, a cam-disk mounted thereon, a crank on said shaft, and means for transmitting movement from both the crank and cam-disk to said plunger, whereby the force exerted is increased during the final steps of the compression-stroke, and the plunger stopped at the compression position.

2. In a baling-press, the combination with a baling-chamber, of a compression-plunger, an operating-shaft, a crank thereon, a cam-disk carried by the shaft, a pitman-rod having one end connected to the plunger, a link connecting the opposite end of the rod to the crank, a cam-operated lever having one end fulcrumed to a fixed point, and the opposite end engaged by the cam, and a link connecting the lever to the first-named link, whereby movement from both the cam and crank may be transmitted to the plunger.

3. In a baling-press, a baling-chamber, a compression-plunger, an operating-shaft, a crank arranged on the shaft, means for connecting the crank to the plunger, and a cam also mounted on the shaft and controlling the transmission of movement from the crank to the plunger.

4. In a baling-press, the combination with a baling-chamber, of a compression-plunger, a cranked operating-shaft, means for transmitting movement from the crank to the plunger, a cam, and means operated by the cam for controlling the effective throw of the crank at different points, and for partly utilizing the effect of the crank action to permit a dwell of the plunger at the completion of the compression-stroke.

5. In a baling-press, the combination with a baling-chamber, of a compression-plunger, a cranked operating-shaft, a cam-disk mounted thereon, connecting means extending between both the crank, the cam and the plunger, a feeding device for forcing material into the baling-chamber in advance of the plunger, a lever connected thereto, and a pin or anti-friction-roller carried by said lever and under the control of said cam-disk.

6. In mechanism of the class described, a vertical shaft arranged at one side of the baling-chamber, a needle carried by the shaft, a disk at the upper end of the shaft, a normally inoperative gear connected to said disk, a constantly-driven shaft, intermediate and normally disconnected gearing connections between said driven shaft and the gear, a link belt operable by contact with the material passing through the baling-chamber, a lever disposed in the path of movement of the belt, and means connected to said lever for connecting the gearing and thus imparting movement to the needle.

7. In mechanism of the class described, a vertical shaft arranged at one side of the baling-chamber, a needle carried by the shaft, a disk secured to the upper end of the shaft, an arm projecting from said disk, a normally inoperative gear, a link connecting the gear to the arm, a constantly-driven shaft having a worm, a second shaft having a worm-gear slidably mounted thereon, a lever for shifting the position of the worm-wheel, gearing connections between the second shaft and the needle-operating gear, and means operable by the passage of the material through the baling-chamber for effecting movement of the worm-wheel-controlling lever.

8. The combination with a baling-press, of a wire-tying mechanism at one side of the baling-chamber, means at the opposite side of the baling-chamber for forcing a wire through the baling-chamber to the tying mechanism, and means adjacent to the tying mechanism for taking up sufficient of the wire to permit the formation of a bale without drawing the wire endwise around said bale.

9. The combination with a baling-machine, of means for feeding the wire across the baling-chamber, and a yieldably-mounted catch or arm for engaging the wire and drawing the same outward from the side of the chamber to an extent sufficient to permit the formation of a bale.

10. The combination with a baling-machine, of means for forcing a wire across the baling-chamber, and a yieldable means for engaging and pulling the end of the wire outward from the sides of the baling-chamber to an extent equal at least to the length of the bale to be formed.

11. The combination with a baling-press, of a wire-twister arranged to receive the ends of a bale-wire, and to intertwist said ends with another portion of the same wire.

12. The combination with a baling-machine, of a wire-twister arranged to receive and twist the two ends of the bale-wire, and to intertwist such ends with another portion of the same wire.

13. In a device of the class specified, means for engaging and intertwisting the ends of a bale-wire, means for bending the twisted ends into parallel relation with another portion of the same wire, and means for operating the twister to intertwist said ends with the wire.

14. In mechanism of the class described, means for engaging the ends of a bale-wire and bending the same into parallel relation with another portion of the same wire, and means for twisting the three strands of wire.

15. In mechanism of the class described, a twisting-disk having a wire-receiving groove, means for introducing the two ends of a bale-wire into said groove, means for revolving the disk to intertwist said ends, means for moving said disk to effect the introduction of another portion of the bale-wire into the groove, the twister-operating means then serving to again revolve the disk.

16. In a device of the class specified, the combination with a notched twisting-disk, of means for effecting two successive rotative movements of the disk during each operation, means for introducing the ends of a bale-wire into the notch of the disk before the first movement of said disk, and means for moving said disk to effect the introduction of another portion of the bale-wire into the notch between the first and second rotative movements of the disk.

17. In a twisting mechanism, a notched twisting-disk, means for imparting successive rotative movements thereto, and mechanism for introducing wires into the notch in advance of each rotative movement, the wires first introduced being twisted to a greater extent than the wire introduced after the first movement of the disk.

18. In mechanism of the class described, a notched twisting-disk, means for gripping one end of a bale-wire that extends through said notch, means for passing the loop of the wire around the bale and introducing one portion of the loop into the twister and into engagement with the gripper, means for engaging that portion of the loop beyond the gripper and drawing the same outward, means for turning the disk to intertwist the two wires in the notch, means for severing the wire ends between the twister and the gripper, and means for turning the disk to permit its engagement with another portion of the bale-wire in advance of a second rotative movement of said disk.

19. In mechanism of the class described, the combination with a pivotally-mounted block, of a hollow shaft forming the block-fulcrum, a bevel-gear secured to the shaft, a pinion intermeshing with the gear, a shaft carrying said pinion, a notched twisting-disk having peripheral teeth, a gear mounted on the shaft and engaging said teeth, a gripper, means for introducing wires into the notch of the twister and into the gripper, means for revolving the shaft and thereby imparting initial movement to the twister, means carried by the bevel-gear for engaging the block and turning the latter, together with the twister to a position in alinement with another portion of the bale-wire, and a wire-cutter operable on initial movement of said block to sever the wires between the disk and cutter.

20. In apparatus of the class described, the combination with a hollow shaft, of a movable spindle extending through the shaft and projecting beyond the gear to form a wire-bending pin, means for depressing the spindle to disengage the same from the wire, a bevel-gear carried by the shaft, a pinion intermeshing with said gear, a shaft carrying the pinion, a gear on the pinion-carrying shaft, a block fulcrumed on the hollow shaft and forming a support for the pinion-carrying shaft, a notched twister-disk supported by the block, and driven by the gear-wheel of the pinion-carrying shaft, a wire-gripper, means for introducing wires into the gripper and the notched twister, a wire-severing knife between the gripper and twister, a gear on the hollow shaft, a pawl-and-ratchet connection between said gear and hollow shaft, a spring connected to the hollow shaft and serving to restore the same to initial position at the completion of each operation, and a give-way connection between the bevel-gear and the block, whereby after a partial movement of the twister, the block will be turned to present the twister into alinement with another portion of the bale-wire, and means for tripping the pawl to permit the spring to restore the parts to initial position.

21. In mechanism of the class described, a notched twister-disk, means for feeding the ends of a bale-wire thereinto, a twister-operating means, mechanism for moving said twister to effect the introduction of another portion of the bale-wire into the notch in advance of the completion of the twisting operation, and means for engaging and bending the end portions of the bale-wire during the movement of the twister from one position to the other.

22. In mechanism of the class described, a twister, a pivotally-mounted block carrying said twister, a wire-cutter operable on initial movement of said block, and means for moving the block to present the twister-carried wires in parallel relation with another portion of the same wire.

23. In mechanism of the class described, a wire-gripper comprising a disk having peripheral notches, one wall of each notch forming a gripping-jaw, a pivotally-mounted arm arranged adjacent to each notch and forming a second gripping-jaw, a spring tending to force the arm toward its meeting jaw, and a wire-tripped latch for holding the arm away from said jaw.

24. In mechanism of the class described, a wire-gripper comprising a disk having peripheral notches, one wall of each notch forming a wire-gripping jaw, a spring-pressed arm arranged to form the second jaw and having a curved end portion extending beyond the periphery of the disk, and a spring-held latch engaging the frame and holding the same in open position, the latch being in position to be tripped by a wire entering the notch.

25. In a baling-press, a baling-chamber, a plunger, a pair of disks carrying crank-pins, a knife carried by the crank-pins, a spring tending normally to maintain the knife in elevated position, and means for depressing the knife for severing the protruding material.

In testimony that I claim the foregoing as my own I have hereto affixed my signature in the presence of two witnesses.

PETER J. W. HELDT.

Witnesses:
LEWIS SCHARNBERG,
J. W. FLICK.